United States Patent [19]

Benjamin

[11] 4,098,459

[45] Jul. 4, 1978

[54] VACUUM BREAK DEVICE

[75] Inventor: Benjamin C. Benjamin, Flint, Mich.

[73] Assignee: Schmelzer Corporation, Durand, Mich.

[21] Appl. No.: 709,970

[22] Filed: Jul. 30, 1976

[51] Int. Cl.[2] .............................................. G05D 23/01

[52] U.S. Cl. .......................................... 236/87; 92/48; 236/101 C; 261/234; 261/39 B

[58] Field of Search .................. 123/119 F; 261/39 B, 261/23 A; 236/86, 87, 101 C; 92/13.2, 48, 49

[56] References Cited

U.S. PATENT DOCUMENTS

| | | | |
|---|---|---|---|
| 2,954,022 | 9/1960 | Mick | 261/23 A X |
| 3,433,132 | 3/1969 | James | 92/48 |
| 3,752,450 | 8/1973 | Charron et al. | 261/65 X |
| 3,831,567 | 8/1974 | Freismuth et al. | 123/119 F X |
| 3,915,132 | 10/1975 | Thornburgh | 92/48 X |
| 3,923,427 | 12/1975 | Uyeda | 92/49 X |
| 3,956,433 | 5/1976 | Garcea | 123/119 F X |
| 3,965,223 | 6/1976 | Benjamin | 261/39 B |

*Primary Examiner*—William E. Wayner
*Assistant Examiner*—William E. Tapolcai, Jr.
*Attorney, Agent, or Firm*—Fisher, Gerhardt & Groh

[57] ABSTRACT

A double diaphragm, two stage vacuum break device in which the vacuum break plunger operates in a first stage in response to movement of one diaphragm assembly and in a second stage in response to movement of a pair of diaphragm assemblies. Metering valves are employed to cause delay of movement of the vacuum break devices in each of its ranges and delay can be eliminated from a selected one or both of the stages of movement by omitting a valve member. The stages of movement are under the control of separate sources of vacuum, a selected one of which may be under control of a temperature responsive valve. The range of movement of the plunger in its two stages of operation may be adjusted by mechanical means or a member responsive to temperature.

19 Claims, 4 Drawing Figures

VACUUM BREAK DEVICE

Vacuum break devices have been used with the carburetors of internal combustion engines on automobiles and usually two vacuum break devices are required, both of which must be designed for the particular model of engine and automobile on which the devices are to be used. This makes it necessary not only to have two vacuum break devices for each vehicle, but also, to have a variety of types of vacuum break devices for different models of engines and for different models of vehicles.

It is an object of the invention to provide a two stage vacuum break device in which the device operates at one rate in an initial stage and at another rate in a final stage.

Another object of the invention is to provide a single vacuum break device with two stages of operation which supplants the requirement for a pair of vacuum break devices which are now used with carburetors and simplifies the linkage connection between the carburetor and vacuum break device.

Still another object of the invention is to provide a two stage vacuum break in which both stages of operation may be provided with a delay in operation or which can be easily modified to permit delay in a selected one or both of the stages.

Another object of the invention is to provide a two stage vacuum break assembly in which the total stroke of the device may be limited either mechanically or in response to temperature.

Another object of the invention is to provide a two stage vacuum break device in which the delay of the final stage of operation of the device can be varied in response to temperature changes.

A two stage vacuum break device is contemplated for use with carburetors or the like in which the vacuum break device is connected to separate sources of vacuum to operate a plunger successively in first and second stages. Each of the stages of movement may be subject to delay by way of metering valve means or if desired the metering valve means may be omitted so that a selected one or both of the stages of delayed operation is eliminated. Also, if desired, the separate sources of vacuum may be controlled by temperature responsive valves so that the delay of either or both of the stages of operation is proportional to the temperature of the vacuum source. Means are provided for adjusting the total length of the stroke of the vacuum break so that adjustment may be accomplished mechanically or can be varied in proportion to temperature so that as temperature increases the full range of movement of the two stages of operation is increased.

Figure 2:
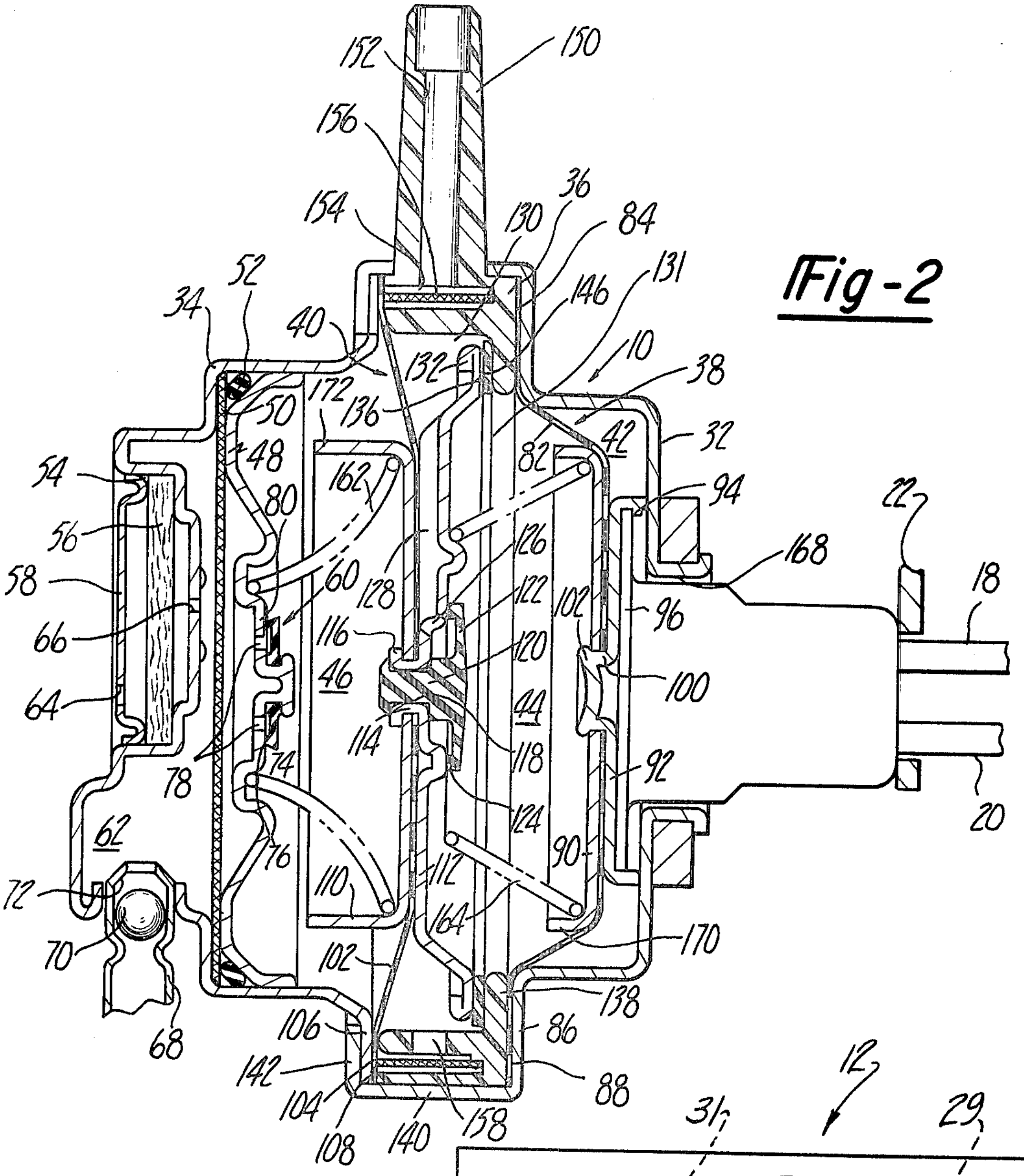
FIG. 2 is a cross-sectional view at an enlarged scale of the vacuum break device shown in FIG. 2.

Referring to the drawings, the vacuum break device is designated generally at 10 and is adapted to be supported on a carburetor 12 by a bracket 14. The vacuum break device 10 includes a housing 16 from which a plunger assembly 18 projects. The plunger assembly 18 includes a primary plunger 20 and a secondary plunger 22 formed with slots 24 and 26, respectively. The slots 24 and 26 are adapted to receive control rods 28 and 30 controlling primary choke valve 29 and secondary choke valve 31 of the carburetor 12.

Referring now to FIG. 2 the housing 16 of the vacuum break device 10 includes a front housing section or cover 32 and a rear housing cover or section 34 which are separated by a center section 36. Preferably the front and rear cover members 32 and 34 are stamped of metal and the center section 36 is molded of plastic material.

Disposed within the housing 16 is a forward diapharagm assembly 38 and a rearward diaphragm assembly 40 which serve to divide the interior of the housing 36 into chambers 42, 44 and 46.

The rear cover assembly 34 includes a rigid interior wall 48 which serves to support a filter element 50 which is held in position by an O-ring seal 52. The rear cover assembly 34 forms an axially offset cavity 54 in which another filter element 56 is held in position by a cap 58. The wall 48 acts to support a valve assembly 60 which controls fluid flow between the chamber 46 at one side of the wall 48 and an intake chamber 62 formed at the opposite side of the wall 48. The seal 52 prevents communication between the chambers 46 and 62 except through the valve assembly 60.

Atmospheric air is admitted through apertures 64 in cap 58 to the filter 56 and through aperture 66 to chamber 62. A source of vacuum such as that made available by the intake manifold of an internal combustion engine is communicated to an intake element 68. The tubular intake element 68 is provided with a check valve 70 which is adapted to seat on a conical seal 72 in the event the engine backfires as a protection for the vacuum break device 10.

The passage of air from the intake chamber 62 to the chamber 46 is under the control of the valve assembly 60 which includes a flexible, disc valve 74 which has an annular bead 76 normally engaging the wall 48. A plurality of openings 78 are formed in the wall 48 to communicate with the underside of the valve 74. A groove 80 communicates the apertures 78 with the chamber 47 when the valve elements 74 are in their closed position as illustrated in the drawings. Upon establishment of the pressure differential in the chambers 46 and 62 such that the pressure in chamber 62 is the highest, the valve elements 74 will flex and move to a position permitting free flow of air through openings 78 between the chambers 46 and 62.

The arrangement of the rear cover assembly 34 together with the filters 50 and 56 and the valve assembly 60 is more fully described in my U.S. Pat. No. 3,991,731 granted Nov. 16, 1976 to which reference may be made for more detailed description.

The forward diaphragm assembly 38 includes a flexible diaphragm 82 having an outer annular lip 84 sandwiched between a flange 86 of the front cover 32 and one face 88 of the center housing section 36. The diaphragm assembly 38 also includes a cup shaped backing plate 90 at one side of the diaphragm 82 and a plate 92 at the opposite side of the diaphragm. The plate 92 is crimped as indicated at 94 to hold a flange 96 forming part of the plunger assembly 18. The plate 92 includes a center stem 100 which is upset at 102 to clamp the plates 90 and 92 to opposite sides of the diaphragm 82.

The rearward diaphragm assembly 40 includes a flexible diaphragm 102 made of elastomeric material which has its outer circumferential lip 104 clamped between a flange 106 of the rear cover 34 and a face 108 of the center housing section 36. The central portion of the diaphragm 102 is reinforced by a cup shaped backing plate 110 disposed at one side of the diaphragm 102. A second backing plate 112 is disposed at the opposite side of the diaphragm 102 and includes a central stem portion 114 which passes through an opening in the backing plate 110 and is bent or crimped at 116 to clamp the backing plates 110 and 112 to opposite sides of the diaphragms. The stem 114 has a central aperture 118 which receives the stem 120 of a mushroom type valve element 122. The valve element 122 has an annular beaded portion 124 which is adapted to seat with surfaces of the backing plate 112. The underside of the valve element 112 communicates by way of one or more openings 126 and radial passages, one of which is indicated at 128 to an annular cavity or subchamber 130 formed circumferentially adjacent an outer lip 132 and at one side of the backing plate 112. A second subchamber 131 is formed in chamber 44 at the other side of the backing plate when the lip 132 is engaged with a seat 136.

The outer annular lip 132 at the periphery of the plate 112 is adapted to engage the annular seal 136 which rests against a radially inwardly extending flange 138 forming part of the housing center section 36. The flange 138 also forms part of the face 88 against which the flange 86 of the diaphragm 82 is clamped. The flange 86 of the forward cover 32 has an axially extending portion 140 which is bent over as indicated at 142 to engage the flange 106 of the rear cover 34 so that the diaphragms 82 and 102 are clamped against the center section 36 in fluid tight sealing engagement.

It will be noted that the diaphragm 82 and 102 have substantially the same overall diameter. However, the flange 138 of the center section and flange 86 of the forward cover 32 engage the diaphragm 82 radially inwardly and serves to reduce its effective area, that is, the area upon which differential pressure acts during operation of the vacuum break device. The effective area of diaphragms 82 and 102 may be considered to be an area defined by a radius somewhat less than the radius of the flexing portion of the diaphragm with the effective area of diaphragm 82 being substantially less than the effective area of diaphragm 102.

The lip 132 engages the seal 136 at a point such that the encompassed area within the seal is greater than the effective area of the diaphragm 82 and less than the effective area of the diaphragm 102. The relationship of these areas is for the purpose of insuring that the lip 132 remains in engagement with the seal 136 when the chamber 130 is subjected to vacuum.

The lip 132 is formed with a radially extending groove 146 by which fluid pressure in the subchamber 130 may communicate with the subchamber 131.

Vacuum may be communicated to the subchamber 130 and through the bleed opening 146 by way of an inlet element 150 which is tapered to receive a vacuum hose or the like connected with a source of vacuum not shown. The inlet element 150 has a passage 152 which communicates with an annular cavity 154. The annular cavity 154 is open to the face 108 and in the assembled condition is closed by the lip 104 of the diaphragm 102. The cavity 154 is provided with an annular filter 156. The passage 152 is in fluid communication through the annular passage 154 and through the filter 156 to a passage 158 formed in the center section 36 in diametrically opposed relationship to the passage 152. In passing between the passage 152 and the opening 158, air must pass through the filter 156.

A spring 162 has one end seated against the wall 48 and its other end reacting against the backing plate 110 so that the diaphragm assembly 40 is urged to the right as viewed in the drawings so that the lip 132 engages the seal 136. Also, a conical spring 164 has one end engaged with the backing plate 112 of the diaphragm assembly 34 and the other end seated in the cup shaped backing plate 90 of the forward diaphragm assembly 38. The spring 164 serves to urge the diaphragm assembly 38 to the right relative to the diaphragm assembly 40 so that an annular flange 166 of plate 92 engages a wall of the forward cover 32.

The inlet element 150 and the tube 68 may be connected to separate sources of vacuum with the inlet 68 under the control of a temperature responsive valve such that vacuum is admitted to the tube 68 only after the engine on which the carburetor is mounted has reached a predetermined temperature level. Consequently, upon starting an engine the vacuum will be admitted to the inlet 150 initially and after the engine reaches the predetermined temperature level vacuum will be admitted to the tube 68.

Upon admission of vacuum to the inlet 150 vacuum pressure is established in the subchamber 130 and the parts remain in the position illustrated in FIG. 2. The subchamber 131, which will be under initial atmospheric pressure, will slowly come under the influence of vacuum pressure by way of the bleed passage or metering notch 128. The chamber 42 is under constant atmospheric pressure due to the opening 168 around the plunger 18 in the forward cover plate 32. As a result, differential pressure acts on the diaphragm assembly 38 causing it to move to the left relative to the stationary diaphragm assembly 40. The diaphragm assembly 40 remains in position due to atmospheric pressure existing in the chamber 46 acting against the vacuum pressure in the chamber 130. The diaphragm assembly 38 will move to the left until the annular flange 170 of the backing plate 90 comes into engagement with the face of the vacuum plate 112 in which position the spring 164 will be fully collapsed.

Upon subsequent evacuation of the tube 68 and the inlet chamber 62, air will pass through the openings 78 and the metering notch 80 to establish vacuum pressure in the chamber 46. Upon equalization of pressures at opposite sides of the diaphragm assembly 40 atmospheric pressure in the chamber 42 will be effective to move both diaphragm assemblies 38 and 40 in unison to the left to collapse the spring 162. Such movement can continue until the flange 172 on the backing plate 110 engages the wall 48.

When vacuum is terminated at the inlets 150 and tube 68 and atmospheric pressure is established the valves 60 and 122 will flex under the influence of differential pressures so that their respective lips 76 and 124 disengage from their wall seats and permit the free flow of air through the opening 78 in the wall 48 and the openings 126 in the backing plate 112. The admission of air in this manner permits the diaphragm assemblies 38 and 40 to return to their initial position under the influence of the return springs 162 and 164.

It will be seen that the initial portion or first stage of the full stroke of the plunger 18 is under the influence of vacuum in the inlet passage 152 and that the final stage is determined by the vacuum level in the inlet tube 68. As a consequence various sequences of operation are made possible by controlling the vacuum levels and rates at which they are established at the inlets 68 and 70 or by modifying the delay or metering aspects afforded by the metering notch 146 between the lip 132 and seal 36 and the operation of the metering notch 80 in the valve assembly 60.

Figure 3:
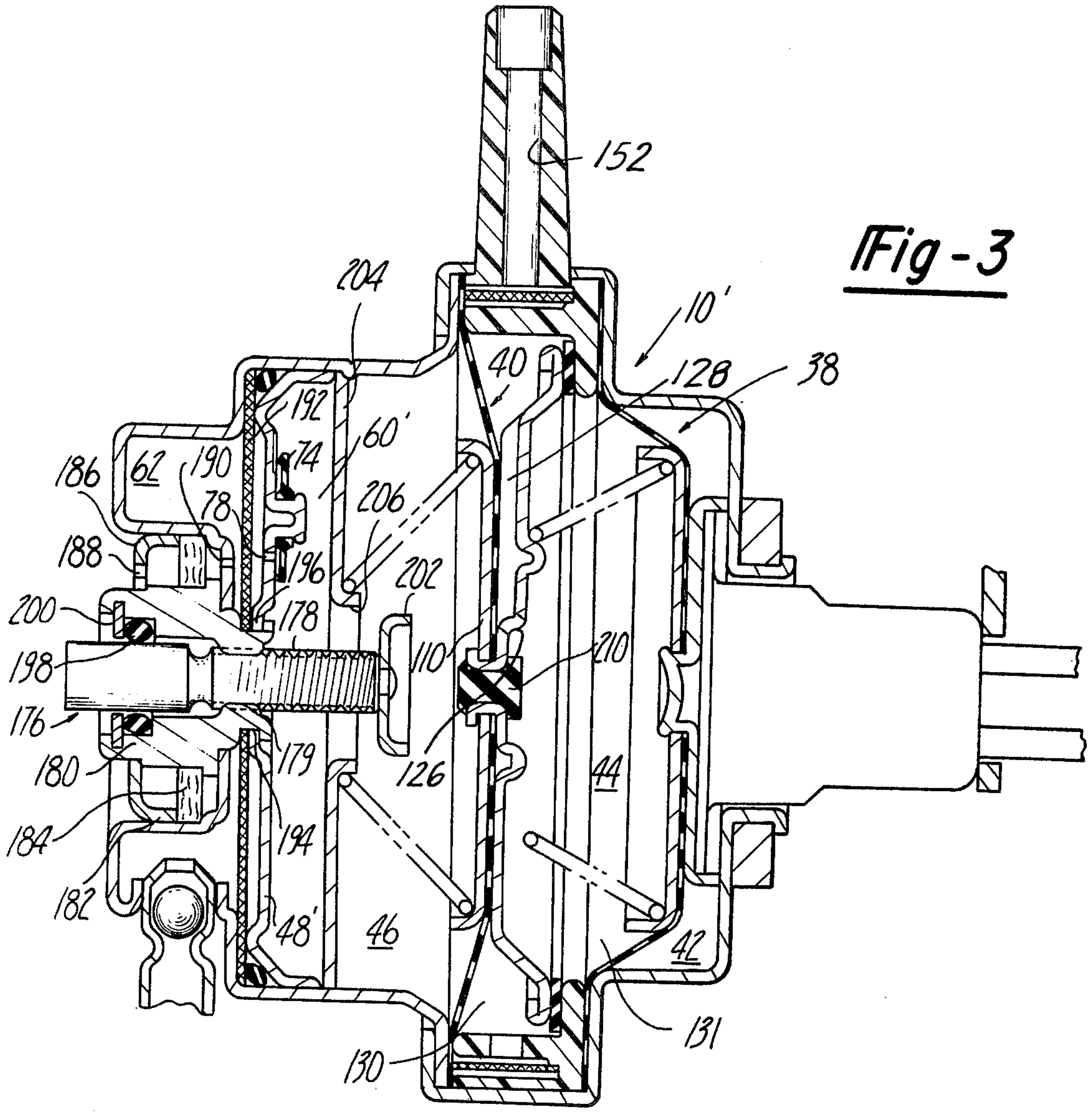
FIG. 3 is a modification of the vacuum break device shown in FIG. 2 showing another embodiment of the invention.

Modifications of the invention are illustrated in FIG. 3 in which much of the structure is substantially identical with the structure illustrated in FIG. 2. In the FIG. 3 arrangement, however, the vacuum break 10' includes a stroke limiting mechanism 176 by which the full stroke or range of movement of the diaphragm assemblies 38 and 40 may be adjusted. The stroke adjusting mechanism 176 includes an externally threaded stem 178 which receives the internal threads 179 of a nut element 180. The nut element 180 is held in position in a recess 182 formed axially in the back cover 34. The recess 182 has an annular filter 184 which is held in position by a cover 186. Openings 188 in the cover 186 and openings 190 in the cover 134 permit air communication through the filter 184 between the exterior of the housing 16 and the chamber 62. The nut 180 also passes through the center of a large filter 192 which is held in position in a groove 194 of the nut 180 together with the radially inner edge 196 of a wall member 48'. A seal 198 is held in position by a washer 200 to engage the stem 178 and the surfaces of the nut 180 to form an air seal preventing fluid passage except through the openings 188 and 190 through the filter 184.

The valve 60 of the vacuum break device 10 in FIG. 2 is disposed axially of the vacuum break unit 10. However, in the device 10' in FIG. 3 the valve is designated at 60' and is shown axially offset. The function of the valves 60' and 60 are the same.

The end of the stem 178 disposed within the chamber 46 is provided with a stop element 202 which is adapted to engage the backing plate 110 of the diaphragm assembly 40 to limit the maximum stroke of the vacuum break device 10'. In use, the stem 178 may be adjusted axially to selected positions by rotating the stem.

The vacuum break device 10' is provided with an annular wall 204 having a flanged opening 206 which acts as a stop against which one end of the spring 162 can react.

In FIG. 3, the diaphragm assembly 40 is shown with a plug 210 which replaces the valve 122 associated with the vacuum break unit 10 in FIG. 2. The plug 210 serves to modify the vacuum break operation so that the first stage of movement of the plunger is without delay. As soon as vacuum is established in the passage 152 it also is established in the subchambers 130 and through radial passage 128 and openings 126 in subchamber 131 so that the diaphragm assembly 38 moves without any delay.

The vacuum break unit may be further modified in its operation to bring about the second stage of operation without delay by removal of element 74 of the valve 60 or 60' so that openings 78 are continuously open to air passage. Without the valve element 74, the establishment of vacuum in the chambers 62 results in simultaneous vacuum pressure in the chambers 46 so that the final stage of movement of the plunger is without delay.

From the above it will be seen that the vacuum break unit 10 may be operated as described in connection with the embodiment shown in FIG. 2 or if desired either the first or second stage of operation can be modified to operate without delay. Moreover, both stages of delay may be eliminated if desired.

Figure 1:
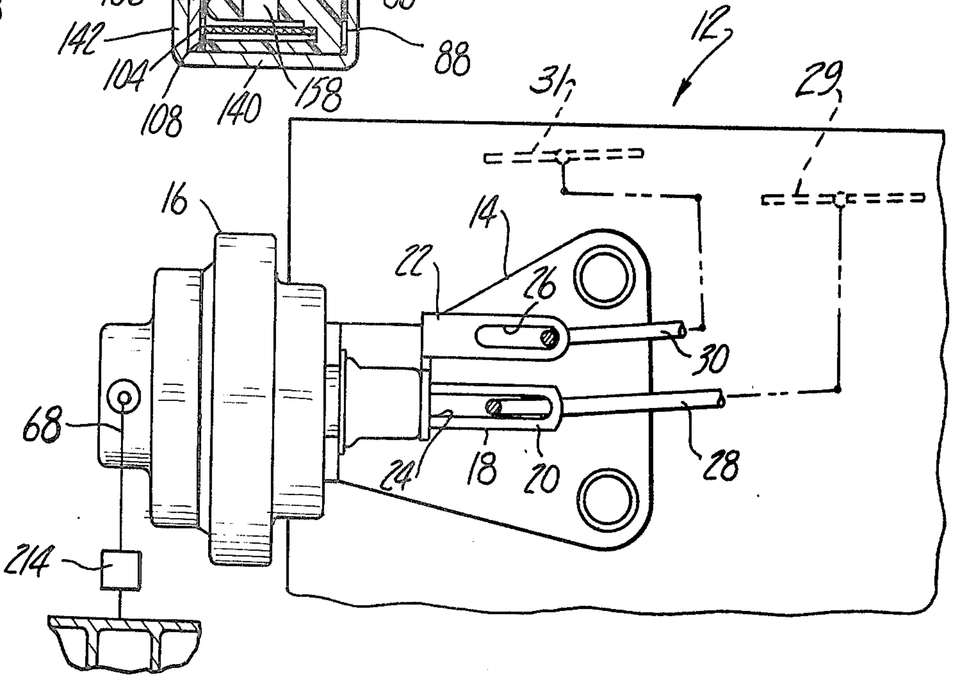
FIG. 1 is a side elevation of the vacuum break device embodying the invention together with associated parts shown diagrammatically.

It sometimes is desirable with certain models of engines and automobiles to vary one or the other stages of operation in response to temperature. As seen in FIG. 1 the line 68 which communicates with the chamber 46 may be provided with a bimetal, temperature responsive valve 214 which tends to move to a fully open position as temperature increases to permit free fluid flow and increase the rate of movement of the diaphragms in the second stage of operation.

Figure 4:
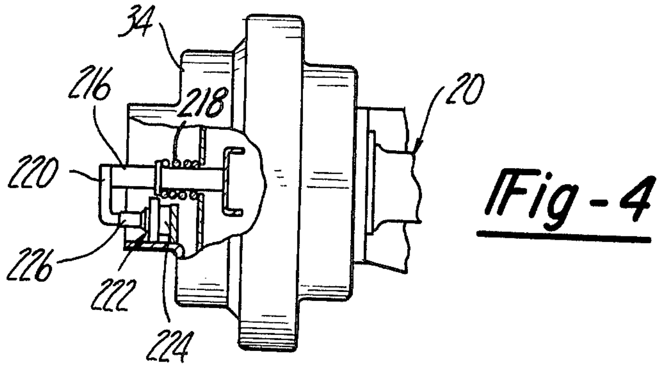
FIG. 4 is a view similar to FIG. 1 showing a modification of the vacuum break device by which its operation is modified in response to temperature.

Actuation of movement of the diaphragm assemblies 38 and 40 may be controlled in response to temperature as described in connection with movement of the diaphragm 40 under the control of the bimetal temperature responsive valve 214. Similarly, the limitation of the maximum stroke of the vacuum break device may be made responsive to temperature as indicated in connection with the embodiments schematically illustrated in FIG. 4. In that embodiment a plunger 216 is slidably mounted in the end cover 34 and is urged to the left under the action of a spring 216. The left end of the plunger 218 rests against a movable stop 220. The stop 220 is supported at the end of a temperature sensitive device 222 which is composed of a capsule 224 containing temperature sensitive material such as wax or the like and a plunger 226 which is forced to the left as viewed in FIG. 4 as temperature increases. As a result, an increase in temperature results in increased stroke of the vacuum break device 10 so that the plunger 20 moves a greater distance as temperature increases.

A vacuum break device has been provided incorporating two diaphragm assemblies permitting movement of a vacuum break plunger successively in two stages in which both stages of movement may be delayed. The arrangement permits a simple modification by which the delay feature may be eliminated from either or both of the stages of movement by a simple elimination of a metering valve feature associated with each stage. The total range of movement in both stages may be adjusted by a mechanical adjusting feature or by a temperature responsive feature. Moreover, the separate sources of vacuum may be further modified selectively by employing a valve response to temperature. The easily modified vacuum break device makes it possible to use the same basic structure on a wide variety of engine and automobile models.

The embodiments of the invention in which an exclusive property or privilege is claimed are defined as follows:

1. A vacuum break comprising; a housing; a pair of movable diaphragm assemblies forming first, second and third chambers in said housing, said second chamber having opposed walls formed by said pair of diaphragm assemblies, means associated with each diaphragm assembly preventing initial movement in one direction, said second and third chambers being connected to separate sources of vacuum, said first diaphragm assembly being movable in the other direction in a first range in response to a vacuum pressure in said second chamber acting on said first diaphragm assembly independently of and relative to said second diaphragm assembly which remains stationary, said first diaphragm assembly being movable in the same direction in a second range in unison with said second diaphragm assembly upon subsequent establishment of vacuum pressure in said third chamber, and plunger means connected to said first diaphragm assembly for movement therewith in said first and second ranges.

2. The combination of claim 1 and further comprising means associated with each of said second and third chambers for delaying establishment of vacuum pressure therein for delaying movement of said plunger means in said first and second ranges.

3. The combination of claim 1 and further comprising delay means in said housing communicating said second source of vacuum with said third chamber.

4. The combination of claim 3 in which said delay means includes a check valve limiting fluid flow in the presence of vacuum at said second inlet and permitting free fluid flow in the absence of vacuum at said inlet.

5. The combination of claim 1 and further comprising means includng a stop movable axially of the path of movement of said diaphragm assemblies to predetermined positions determining the extent of movement of said diaphragm assemblies in said second stage.

6. The combination of claim 5 in which said means is formed by a threaded member movable axially of said housing.

7. The combination of claim 5 in which said stop member is movable to selected positions in response to temperature.

8. The combination of claim 7 in which said stop is movable to a position increasing the amount of movement of said diaphragm assemblies in said second stage upon an increase in temperature.

9. A vacuum break comprising; a housing, a pair of first and second movable diaphragm assemblies forming first, second and third chambers in said housing, said second chamber having opposed walls formed by said pair of diaphragm assemblies, means associated with each diaphragm assembly preventing initial movement in one direction, said second and third chambers being connected to separate sources of vacuum, said first diaphragm assembly being movable in the other direction in a first range in response to a vacuum pressure in said second chamber acting on said first diaphragm assembly independently of and relative to said second diaphragm assembly which remains stationary, said first diaphragm assembly being movable in the the same direction in a second range in unison with said second diaphragm assembly upon subsequent establishment of vacuum pressure in said third chamber, and plunger means connected to said first diaphragm assembly for movement therewith in said first and second ranges, and wherein said second diaphragm assembly includes a movable wall portion engagable with said housing in said second chamber to form first and second subchambers in said second chamber, said vacuum intake being connected to said first subchamber, and metering means communicating said first and second subchambers.

10. The combination of claim 9 in which said first diaphragm assembly has an effective area smaller than the effective area of said second diaphragm assembly, said small portion being engageable with said housing over a circumference defining an area intermediate the effective areas of said first and second diaphragm assemblies.

11. A vacuum break device comprising; a housing, a pair of first and second diaphragm assemblies disposed in said housing and forming first, second, and third chambers in said housing, said second chamber being disposed between said pair of diaphragm assemblies, said second chamber being connected to one source of vacuum and said third chamber being connected to another source of vacuum, said first diaphragm assembly being biased towards said second diaphragm assembly while the latter remains stationary in response to pressure differential upon establishment of vacuum in said second chamber for movement of said first diaphragm in a first range, said first diaphragm assembly being movable in a second range together with said second diaphragm assembly upon subsequent establishment of a vacuum pressure in said third chamber, first delay means operatively controlling fluid flow in said second chamber to delay movement of said first diaphragm assembly in said first range, and second delay means operatively controlling fluid flow to said third chamber to delay movement of said first diaphragm assembly in said second range.

12. The combination of claim 11 in which said first and second delay means each include a valve detachably supported for easy removal whereby said delay means is rendered inoperative selectively by removal of said valve means.

13. A vacuum break comprising; a housing, a pair of diaphragm assemblies forming first, second and third chambers in said housing, said second chamber having opposed walls formed by said pair of diaphragm assemblies, said second and third chambers being connected to separate sources of vacuum, said first diaphragm assembly being movable in a first range in response to a presssure differential acting thereon independently of and relative to said second diaphragm assembly, said first diaphragm assembly being movable in a second range in unison with said second diaphragm assembly upon establishment of vacuum pressure in said third chamber, plunger means connected to said first diaphragm assembly for movement therewith in said first and second ranges, said second diaphragm assembly including a wall portion engageable with said housing to form first and second subchambers in said second chamber, said vacuum intake being connected to said first subchamber, and metering means communicating said first and second subchambers wherein said metering means is a groove formed in the periphery of said wall portion.

14. The combination of claim 13 and further comprising a one way valve formed in said second diaphragm assembly and normally being closed and when first diaphragm assembly is moving in one direction and open when said first diphragm assembly is movable in the opposite direction.

15. A vacuum break comprising; a housing, pair of diaphragm assemblies forming first, second and third chambers in said housing, said second chamber having opposed walls formed by said pair of diaphragm assemblies, said second and third chambers being connected to separate sources of vacuum, said first diaphragm assembly being movable in a first range in response to a pressure differential acting thereon independently of and relative to said second diaphragm assembly, said first diaphragm assembly being movable in a second range in unison with said second diaphragm assembly upon establishment of vacuum pressure in said third chamber, plunger means connected to said first diaphragm assembly for movement therewith in said first and second ranges, delay means in said housing communicating said second source of vacuum with said third chamber wherein said delay means includes a temperature responsive valve between said second source of vacuum and said third chamber in which the volume of air passage is in direct proportion to temperature.

16. The combination of claim 15 in which said delay means includes a temperature responsive valve operative to increase the amount of fluid flow as temperature increases.

17. A vacuum break comprising; a housing, a pair of diaphragm assemblies forming first, second and third chambers in said housing, said second chamber having pposed walls formed by said pair of diaphragm assemblies, said second chamber being connected through one inlet to one source of vacuum and said third chamber being connected to a separate source of vacuum, said first diaphragm assembly being movable in a first range in response to a pressure differential acting thereon independently of and relative to said second diaphragm assembly, said first diaphragm assembly being movable in a second range in unison with said second diaphragm assembly upon establishment of vacuum pressure in said third chamber, and plunger means connected to said first diaphragm assembly for movement therewith in said first and second ranges, said first and second diaphragm assemblies being spaced apart by an annular housing section, said annular housing section having a cavity supporting a filter element, said cavity being in communication with said one inlet and with said second chamber, said communication between said cavity and said second chamber being by way of passage means diametrically opposite to said one inlet.

18. The combination of claim 17 in which said cavity is in the form of an annular groove open axially to one surface of said annular ring, said second diaphragm assembly including a diaphragm portion closing said opening, and an annular filter in said recess.

19. A vacuum break comprising; a housing, a pair of diaphragm assemblies forming first, second and third chambers in said housing, said second chamber having opposed walls formed by said pair of diaphragm assemblies, said second and third chambers being connected to separate sources of vacuum, said first diaphragm assembly being movable in a first range in response to a pressure differential acting thereon independently of and relative to said second diaphragm assembly, said first diaphragm assembly being movable in a second range in unison with said second diaphragm assembly upon establishment of vacuum pressure in said third chamber, plunger means connected to said first diaphragm assembly for movement therewith in said first and second ranges, said housing including an annular ring, said annular ring having a radially extending annular flange, said second diaphragm assembly having a wall member engageable with said flange to divide said second chamber into said first and second subchambers.

* * * * *

UNITED STATES PATENT AND TRADEMARK OFFICE

CERTIFICATE OF CORRECTION

PATENT NO. : 4,098,459

DATED : July 4, 1978

INVENTOR(S) : Benjamin C. Benjamin

It is certified that error appears in the above-identified patent and that said Letters Patent are hereby corrected as shown below:

Column 2, line 36, "seal" should read --seat--
line 45, "47" should read --46--
Column 3, line 18, "112" should read --122--
line 24, "seat" should read --seal--
Column 4, line 61, "opening" should read --openings--
Column 5, line 36, "at" should read --as--

Column 6, line 45, "response" should read --responsive--
line 52, "housing;" should read --housing, --
Column 7, line 58, "small" should read --wall--
Column 8, line 45, after closed delete "and"
Column 9, claim 17, line 9, "pposed" should read --opposed--

Signed and Sealed this

*Third* Day of *April 1979*

[SEAL]

*Attest:*

RUTH C. MASON
*Attesting Officer*

DONALD W. BANNER
*Commissioner of Patents and Trademarks*